(12) United States Patent
Ikeda

(10) Patent No.: US 6,212,681 B1
(45) Date of Patent: Apr. 3, 2001

(54) INFORMATION PROCESSING APPARATUS AND METHOD THEREFOR IN A DATA TRANSFER NETWORK

(75) Inventor: Toshihiro Ikeda, Toyonaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 08/875,692

(22) PCT Filed: Nov. 29, 1996

(86) PCT No.: PCT/JP96/03513

§ 371 Date: Aug. 1, 1997

§ 102(e) Date: Aug. 1, 1997

(87) PCT Pub. No.: WO97/21308

PCT Pub. Date: Jun. 12, 1997

(30) Foreign Application Priority Data

Dec. 1, 1995 (JP) .................................................. 7-313962

(51) Int. Cl.⁷ .................................................. H04N 7/173
(52) U.S. Cl. ........................... 725/92; 725/115; 725/145
(58) Field of Search ................................. 348/7, 12, 13, 348/8; 455/4.2, 5.1; 345/327; H04N 7/173

(56) References Cited

U.S. PATENT DOCUMENTS

| | | |
|---|---|---|
| 4,897,714 | 1/1990 | Ichise et al. . |
| 5,051,822 | 9/1991 | Rhoades . |
| 5,371,532 | 12/1994 | Gelman et al. . |
| 5,524,272 * | 6/1996 | Podowski et al. .................. 455/3.2 |
| 5,550,863 * | 8/1996 | Yurt et al. .......................... 375/240 |
| 5,640,453 * | 6/1997 | Schuchman et al. .............. 380/10 |
| 5,720,037 * | 2/1998 | Biliris et al. ...................... 345/327 |
| 5,751,336 * | 5/1998 | Aggarwal et al. ................. 348/7 |
| 5,781,734 * | 7/1998 | Ohno et al. ........................ 709/217 |

FOREIGN PATENT DOCUMENTS

| | | |
|---|---|---|
| 5-41858 | 2/1993 | (JP) . |
| 6-261319 | 9/1994 | (JP) . |
| 7-123398 | 5/1995 | (JP) . |
| 7-284084 | 10/1995 | (JP) . |
| 95/26095 | 9/1995 | (WO) . |
| 95/26103 | 9/1995 | (WO) . |

* cited by examiner

Primary Examiner—Victor R. Kostak
(74) Attorney, Agent, or Firm—Wenderoth, Lind & Ponack, L.L.P.

(57) ABSTRACT

Digital data of a plurality of video/audio softs is stored in a plurality of random-accessible large capacity storage device (9) and a control device (8) designates the reading of the video/audio softs and a vacant channel number to decoder devices of a multi-channel output, so that the designated video/audio softs are intermittently read out by time division from the large capacity storage devices every predetermined blocks by the decoder devices to be temporarily stored and thereafter decoded and outputted from the designated number channels, and thus, any soft can be supplied to the terminal devices at any supply starting time, irrespective of whether the requested softs are the same or different, so long as the number of the output channels of the data processing device is within the permissible range. The softs can be supplied to a number of terminal devices of which the number is beyond the number of the prepared softs, and even when the requests are concentrated to a specific soft, the access of the soft can be performed in a short time without increasing the waiting time, and it may be sufficient to merely prepare a small capacity memory in the decoder devices, so that the cost of the decoder devices can be reduced.

17 Claims, 9 Drawing Sheets

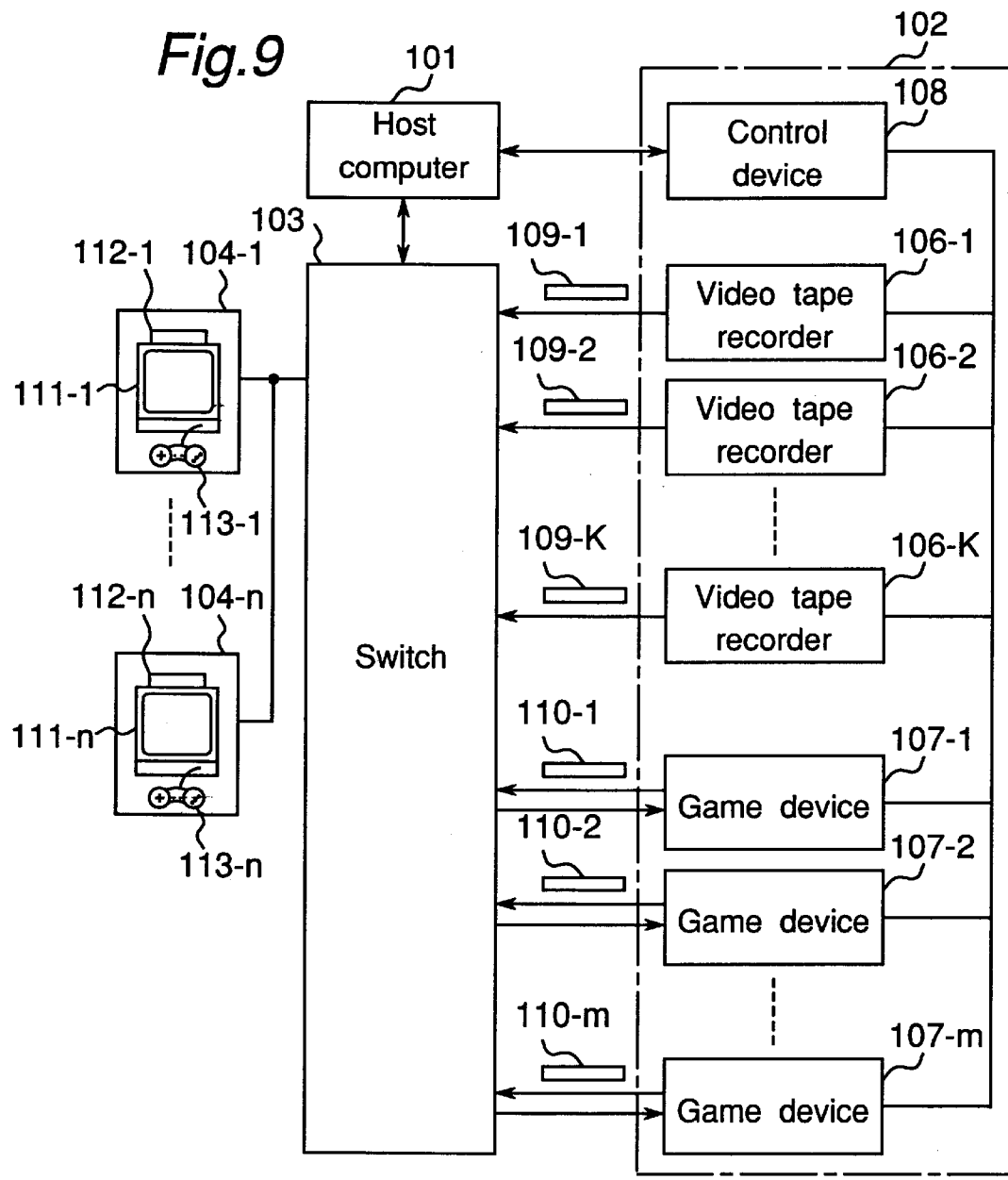

INFORMATION PROCESSING APPARATUS AND METHOD THEREFOR IN A DATA TRANSFER NETWORK

TECHNICAL FIELD

The present invention relates to a video/audio information processing apparatus and method thereof capable of supplying any data file requested for reproduction to a plurality of terminal devices in a multi-channel data transfer network when in case within a permissible range of an output channel number of the video/audio information processing apparatus, and in particular to a video/audio information processing apparatus and method thereof intermittently reading out in time division a digital data file of a video/audio soft previously stored in a random-accessible mass storage means in response to an external reproduction designation command and decoding and continuously generating as video/audio data from a designated channel. Relating to the video/audio information processing apparatus and method thereof, in an information central processing room such as, e.g., a management room of a hotel, there are provided a video/game server device as a supply source of data files of video/game and the like, a switching device (referred to as "switch", hereinafter), a host computer for generally controlling these, and the like, while in the terminal user side of such as each guest room of the hotel, there is provided a video/audio terminal device which comprises a television monitor, a set-top box and a game pad, whereby the host computer receives a request for reproduction of a video/audio data file transmitted from each terminal side and then the host computer controls the video/game server device and the switch to thereby supply the requested video/audio data file to the video/audio terminal side, thus realizing the so-called video-on-demand. In the explanation hereinbelow, the video/game server device mentioned above is referred to as a data processing device.

BACKGROUND OF THE INVENTION

In recent years, there has been a demand for a video/audio information processing and supplying system capable of collectively managing processes of storage, search, reproduction and the like of a data file of video/game soft and the like, and also capable of automatically adding and renewing a data file and managing a soft with a reduction in total equipment, reducing the time in accessing to a soft.

The following describes a conventional video/audio information processing system in a multi-channel data transfer network with reference to a drawing.

FIG. 9 shows an essential construction of a conventional video/audio information processing system of this type. In FIG. 9, 101 is a host computer, 102 is a data processing device, 103 is a switch, and 104-1 through 104-n (represented by "104", hereinafter) are video/audio terminals. The host computer 101, data processing device 102 and switch 103 are provided in a data control center such as, e.g., a management room of a hotel while the video/audio terminal 104 is provided in, e.g., each guest room of the hotel, where data transmission between the switch 103 and each terminal 104 is performed via, for example, a coaxial cable.

The host computer 101 generally controls the data processing device 102 and the switch 103 and receives requests (demand) from the plurality of video/audio terminals 104 and then transfers the received requests to the data processing device 102. Also, the host computer 101 controls the switch 103 to supply the video/audio data from the data processing device 102 to the video/audio terminals 104 which transmitted the requests.

The data processing device 102 includes a plurality of video tape recorders 106-1 through 106-k (represented by "106", hereinafter), a plurality of game player devices 107-1 through 107-m (represented by "107", hereinafter) and a control device 108. The control device 108 receives a request from the host computer 101 and transmits a reply to the host computer and controls the playback, stopping, rapid feeding, reverse winding and the like operation of the video tape recorders 106, and also controls the starting, stopping and the like of the game player devices 107.

The video tape recorders 106 have optional cassette softs 109-1 through 109-k (represented by "109", hereinafter) previously inserted, and similarly the game players 107 have optional CD-ROM game softs 110-1 through 110-m (represented by "110", hereinafter) inserted. As to what video softs are provided in each video tape recorder 106 and what game softs are provided in each game player 107, it is confirmed by previously registering as management information the number of each video tape recorder 106 or each game player 107 paired with the name of each video soft 109 or each game soft 110 in the control device 108. In addition, information as to whether the video tape recorder 106 or game player 107 is being used or not, is also registered as management information.

It is noted here that it is not necessary to provide different video softs from each other in the video tape recorders and that a plurality of video tape recorders may be provided with video softs having the same contents, if necessary. This may be similarly applied to the game devices.

The switch 103 connects in circuit line in optional combination between each video tape recorder 106/ game player 107 and each video/audio terminal 104 in response to a control signal from the host computer 101.

The video/audio terminals 104 comprise television monitors 111-1 through 111-n, set-top boxes 112-1 through 112-n selecting, e.g., a program, and game pads 113-1 through 113-n, respectively, and are commonly connected to an output terminal of the switch 103 via, e.g., a coaxial cable, and are allocated to different frequencies, namely, different channels from each other.

Herein, the following describes a reproduction procedure of a data file of a video soft or a game soft in the conventional example mentioned above.

When the set-top box 112-1 of, for example, a video/audio terminal 104-1 is operated to send a request for reproduction of a data file of a video soft A from the set-top box 112-1 to the host computer 101 via the switch 103, the host computer 101 receives the request and transmits the request to the control device 108 in the data processing device 102.

In the control device 108 which received the request for the video soft A from the host computer 101, it is searched, based on the management information, which video tape recorder among the plurality of the video tape recorders 106 is provided with the video soft A, and it is also examined based on the management information whether or not the video tape recorder is being used. Assuming that the requested video soft A is provided in, e.g., a video tape recorder 106-2 and the video tape recorder 106-2 is not under usage, the control device informs the host computer 103. that the data file of the video soft A is reproduced from the video tape recorder 106-2 and commands the video tape recorder 106-2 to start the reproduction operation.

When the host computer 101 receives the information from the control device 108, the host computer controls the connecting condition of the switch 103 so that the circuit line is connected between the video tape recorder 106-2 and the video/audio terminal 104-1 which transmitted the request for the soft A. Accordingly, the data of the video soft A reproduced by the video tape recorder 106-2 is supplied by transmission to the video/audio terminal 104-1 via the switch 103, and the data of the video soft A is displayed on the television monitor 111-1 while the audio data thereof is generated from a loudspeaker attached to the television monitor. Thus, a person in a room provided with the video/audio terminal 104-1 can enjoy the video soft A.

If the video tape recorders provided with the video soft A are all being used, a reply that there is no vacancy for enjoying the video soft A is sent to the host computer 101 and the host computer 101 transmits the effect via the switch 103 to the video/audio terminal 104-1 which generates the request.

In the case where there is a request for reproduction of another video soft B from, e.g., a set-top box 112-n of another video/audio terminal 104-n to the host computer 101 via the switch 103 under the condition that the data file of the video soft A is being sent from the data processing device 102 to the video/audio terminal 104-1, the host computer 101 receives the request and transfers the request for reproduction of the video soft B to the control device 108 in the data processing device 102. In the control device 108 having received the request for the video soft B from the host computer 101, in a similar manner to the above mentioned, when there is a vacancy, the data of the video soft B is transferred from the data processing device 102 to the video/audio terminal 104-n, and when there is no vacancy, the effect is transmitted to the video/audio terminal 104-n.

In the case where there is a request for reproduction of a game soft C from, e.g., a set-top box 112-2 of another video/audio terminal 104-2 to the host computer 101 via the switch 103 under the condition that the data file of the video soft A is being sent from the data processing device 102 to the video/audio terminal 104-1, the host computer 101 receives the request and transfers the request for reproduction of the game soft C to the control device 108 in the data processing device 102.

In the control device 108 having received the request for the game soft C from the host computer 101, it is searched based on the management information which game device is provided with the game soft C among the game player devices 107-1 through 107-m, and it is also examined based on the management information whether or not the game device is being used.

Assuming that the requested game soft C is provided in, e.g., a game player 107-1 and the game player 107-1 is not under usage, the control device replies to the host computer 101 that the game soft C is outputted from the game player 107-1. The host computer controls the connecting condition of the switch 103 so that the circuit line is connected between the game player 107-1 and the video/audio terminal 104-2 which transmitted the request, and then the control device 108 commands the game player 107-1 to start the data generating operation. Accordingly, the video/audio data of the game soft C reproduced by the game player 107-1 is transferred to the video/audio terminal 104-2 via the switch 103, and the video thereof is displayed on the television monitor 111-2 while the audio data thereof is generated from a loudspeaker attached thereto. Thus, a person in a room provided with the video/audio terminal 104-2 can play the game soft C using the game pad 113-2.

If the game devices provided with the game soft C are all being used, a reply that there is no vacancy for playing the game soft C is sent to the host computer 101 and the host computer 101 transmits the effect via the switch 103 to the video/audio terminal 104-2.

In the case where there is a request for a game soft D from, e.g., a set-top box 112-3 of another video/audio terminal 104-3 to the host computer 101 via the switch 103 under the condition that the game soft C is being sent from the data processing device 102 to the video/audio terminal 104-2, the host computer 101 receives the request and transfers the request for the game soft D to the control device 108 in the data processing device 102. The control device 108 having received the request is operated in a manner similar to the above mentioned, manner namely, when there is a vacancy, the data of the game soft D is transferred from the data processing device 102 to the video/audio terminal 104-3, and when there is no vacancy, the effect is transmitted.

As described above, in the conventional example, when a plurality of video/audio terminals 104 request for reproduction of a video soft or game soft to the host computer 101, these requests are transferred to the control device 108 of the data processing device 102, and as long as there is a vacancy of a video tape recorder or a game device which can reproduce the requested soft, the video soft or game soft can be supplied to the plurality of video/audio terminals 104 by operating the vacant video tape recorder or game device.

Next, when there is given an instruction of stopping reproduction of a video soft or stopping play of a game soft from the video/audio terminal 104 to the host computer 101, the host computer 101 informs the control device 108 that there has been given an instruction of stopping reproduction or stopping play of the soft, and controls the switch 103 to turn off the circuit connection to the video/audio terminal having generated the stop instruction. Also, upon receipt of the information of the stop input from the host computer 101, the control device 108 stops the reproduction operation of the corresponding videotape recorder or game player and registers the effect as the management information.

In addition, in the case of a video soft, when the data reproduction of the soft is finished, the control device 108 stops the reproduction operation of the corresponding video tape recorder and registers the effect as the management information and informs the host computer of the end, so that the switch 103 is controlled to open the circuit connection between the corresponding video/audio terminal and the video tape recorder.

Hereinbelow, the problems of the conventional example are described. For example, in the case where a video soft A is loaded only one video tape recorder 106-2, even when another video/audio terminal requests the same video soft A during the reproduction of the video soft A by a video/audio terminal (e.g., 104-1), the video soft A can not be supplied to the other video/audio terminals until the supply of the video soft A to the terminal 104-1 under reproduction at present is completed. In other words, when a plurality of video/audio terminals request the same soft with time intervals, since it is not ensured that the requested soft is provided in every video tape recorder or game player, there may be a case where the same soft can not be supplied to a plurality of video/audio terminals with time difference.

Moreover, in the case where a plurality of vide/audio terminals request a soft, the soft can not be supplied to the terminals beyond the number of the provided softs and it is impossible to cope with change in frequency of request of each soft, and therefore the waiting time becomes long when the requests are concentrated on a few softs.

In addition, a magnetic tape is used as a data file of a video soft, there is a problem in accessing time because it takes a long time in, e.g, reverse winding.

Furthermore, in an operation of adding or exchanging a video soft or a game soft, the loading and unloading operation of a cassette or compact disc must be manually done by a user, which is a troublesome operation.

In addition, every time a soft is exchanged, the user must change the soft registration of the control device 108, and the management of a soft is complicated.

The first objective of the present invention is to provide a video/audio information processing apparatus and method thereof which is capable of supplying data of any soft to video/audio terminals at any supply starting time as long as the requested softs are within a permissible range of a number of output channels of a data processing device irrespective of whether the softs are the same or different.

The second objective of the present invention is to provide a video/audio information processing apparatus and method thereof which is capable of supplying softs to a number of video/audio terminals beyond the number of the prepared softs.

The third objective of the present invention is to provide a video/audio information processing apparatus and method thereof suppressing a waiting time from increasing even when requests are concentrated onto a specific soft.

The fourth objective of the present invention is to provide a video/audio information processing apparatus and method thereof which is capable of accessing to a soft in a short time.

The fifth objective of the present invention is to provide a video/audio information processing apparatus and method thereof which is capable of automatically adding, exchanging and managing a soft.

SUMMARY OF THE INVENTION

In order to attain the objectives mentioned above, an information processing device and method thereof in a multi-channel data transfer network, comprises:

random-accessible large capacity storage means for storing digital data of a plurality of video/audio softs previously allocated to channels, every predetermined blocks in dispersion;

control means having management information which indicates file names of the plural video/audio softs, recording positions in the large capacity storage means, allocated channel numbers and the like, and receiving a request for designating reproduction of any one data of the plural video/audio softs from an external, and designating reproduction of a data file of one video/audio soft corresponding to the request of reproduction-designation to the large capacity storage means every time the request command is inputted; and decoder means having a plurality of output channels simultaneously outputting video/audio soft data in parallel, registering the management information transferred from the control means, intermittently reading out the video/audio soft data designated by the control means from the large capacity storage means based on the management information, every blocks in dispersion to be decoded, and thereafter continuously outputting the requested video/audio soft data from a channel of a designated number.

In addition, every time an external request for adding/renewal of a video/audio soft is inputted to the control means the control means checks, in response to the adding/renewal request, whether or not there exists a spare room for data transfer to the large capacity storage means, based on the current reproduction condition of the video/audio soft data, and when the large capacity storage means has a spare room for data transfer, the control means confirms the file name of the requested video/audio soft for adding/renewal, and thereafter the control means receives the data of the requested video/audio soft for adding/renewal to thereby carry out the adding/renewal of the video/audio soft to the large capacity storage means in a period when the decoder means reads the data from the large capacity storage means, and when there is no spare room for data transfer, a reply is sent such that the request for adding/renewing the video/audio soft is to be retransmitted after a predetermined time lapse when the presence of a spare room for transfer is guessed based on the present reproduction condition of the video/audio soft.

According to the first aspect of the present invention, digital data of a plurality of video/audio softs is previously stored in dispersion in a random-accessible non-linear large capacity storage means, and a decoder device intermittently reads out a requested and designated video/audio soft every predetermined blocks from the large capacity storage means by time division to be temporarily stored in an internal memory, and reads out from the internal memory to be decoded, and continually outputs as a video/audio signal from a channel of the designated number, and therefore any soft can be supplied to the terminal devices, irrespective of whether the requested softs are the same or different, and irrespective of supply starting time, so long as the number of the output channels of the data processing device is within the permissible range, and the softs can be supplied to a number of terminal devices of which the number is beyond the number of the prepared softs. Moreover, even when the requests are concentrated to a specific soft, the access of the soft can be performed in a short time without increasing the waiting time, and it may be sufficient to merely prepare a small capacity memory in the decoder device, so that the cost of the decoder device can be reduced.

Moreover, according to the second aspect of the present invention, the control device examines the presence or absence of spare room for data transfer to the large capacity storage means 9 based on the data reproduction condition of a video/audio soft according to an adding/renewal command, and when there is a spare room for transfer, the file name of the soft to be added/renewed is confirmed and the adding/renewal of the soft in the large capacity storage means is carried out in an interval in which the decoder device reads the data from the large capacity storage means, and therefore the adding/exchange of a soft can be automatically carried out and also the management of the soft can be automatically carried out.

Moreover, since the video soft data of compression-coded is stored in the large capacity storage means, many sorts and long period video softs can be stored in the large capacity storage means and can be coped with requests for various video softs, and the game softs can be freely played by operating the game pad provided on each terminal device.

BRIEF DESCRIPTION OF THE DRAWINGS

FIG. 9 is a block diagram showing an essential construction of a video/audio information processing system in a conventional example.

DETAILED DESCRIPTION OF THE INVENTION

It is noted that, in the present embodiment, with regard to video data to be stored in a large disk storage device in a data server side, data compression is carried out by a known high efficiency coding method after previously subjecting to A/D conversion, and as a high efficiency coding method of a moving picture, according to, for example, a counsel by MPEG (Moving Picture Experts Group), a video signal is coded by a movement compensation in-frame prediction and subjected to an orthogonal transformation by DCT (discrete cosine transformation) to be quantized and thereafter previously subjected to Huffmann coding or the like process, so that the resultant coded data is stored. Also, in the present embodiment, although a transfer rate of video data is set to 4 Mbps, a larger or smaller value than this may be used in practice.

The following describes an embodiment of the present invention with reference to the drawings.

Figure 1:
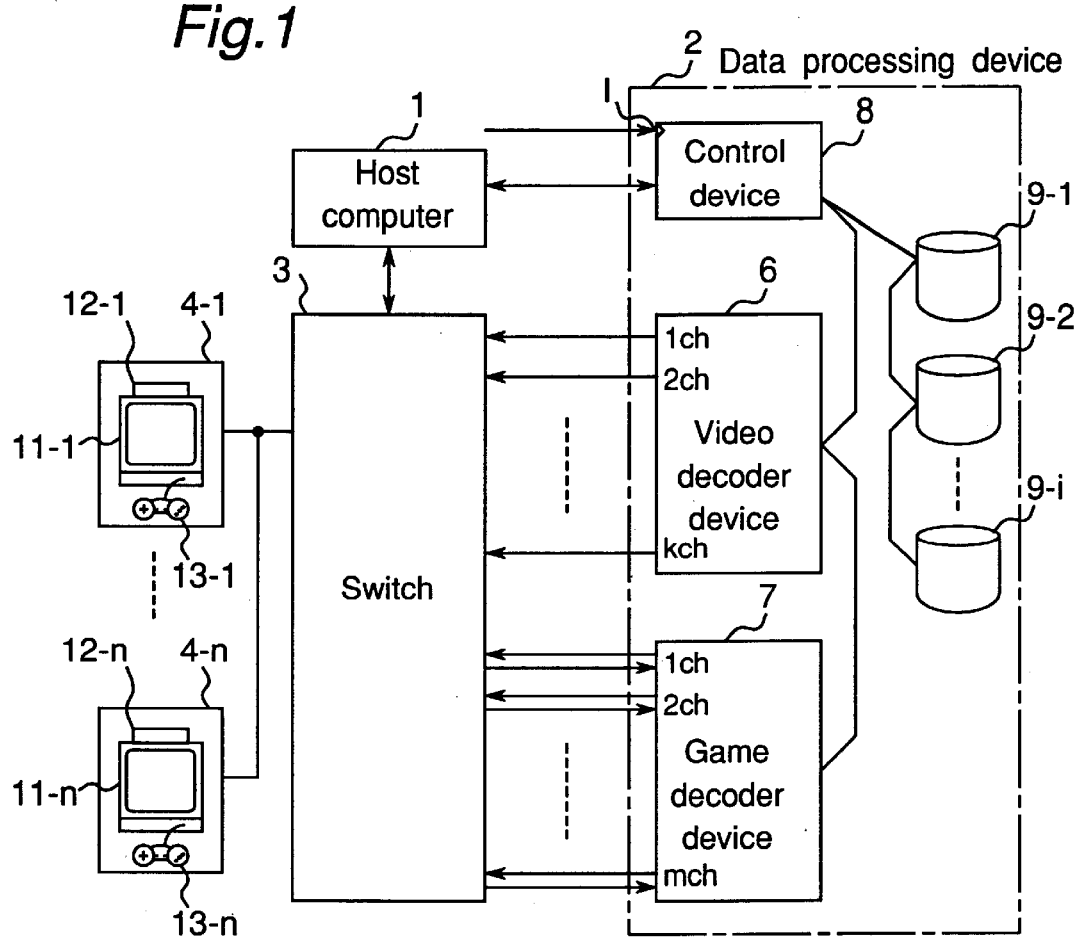
FIG. 1 is a block diagram showing an essential construction of a video/audio information processing system according to an embodiment of the present invention.

FIG. 1 shows an essential construction of a video/audio information processing system according to an embodiment of the present invention, showing a host computer, 1 a data processing device, 2 a switch 3, and 4-1 through 4-n (represented by "4", hereinafter) denote video/audio terminal devices. The host computer 1, data processing device 2 and switch 3 are provided in a centralized control room of a hotel etc. while the video/audio terminals 4 are respectively provided in guest rooms of the hotel, where data transfer between the switch 3 and the respective terminal devices 4 is performed via, e.g., a coaxial cable connected therebetween.

The host computer 1 generally controls the data processing device 2 and the switch 3 and receives requests from any of a plurality of terminal devices 4 and transfers the requests to a control device 8 provided in the data processing device 2, and also controls the circuit connection of the switch 3 so that the reproduced video/audio data is supplied from the data processing device 2 to the terminal device 4 which is a source of generating the request. The host computer 1 is connected to the control device 8 and to the switch 3 via, e.g., a serial transmission cable.

The terminal devices 4 respectively comprise television monitors 11, set-top boxes 12 for selecting a program etc., and game pads 13, and are commonly connected to an output terminal of the switch 3 via e.g. a coaxial cable, and allocated to different frequencies, namely, different channels, which the construction is the same as that of the conventional one.

In case of a video soft, when a reproduction is finished, the control device 8 informs the host computer 1 of the finish of the reproduction, and the host computer 1 controls the switch 3 so that the circuit connection between the terminal devices 4 and the data processing device 2 is opened (turned off).

In the data processing device 2, there are provided a video decoder device 6, a game decoder device 7 and e.g. hard disk drive devices 9-1 through 9-i (represented by "HDD 9", hereinafter), where the control device 8 receives a request from the host computer and sends a reply to the host computer, and also gives various instructions to the video decoder device 6 and game decoder device 7.

The video decoder device 6, game decoder device 7, control device 8 and hard disk drive devices (HDD 9) are interconnected via a WIDE-SCSI transmission cable so that the video decoder device 6, game decoder device 7 and control device 8 are respectively constructed so as to directly access to the HDD 9.

Figure 7:
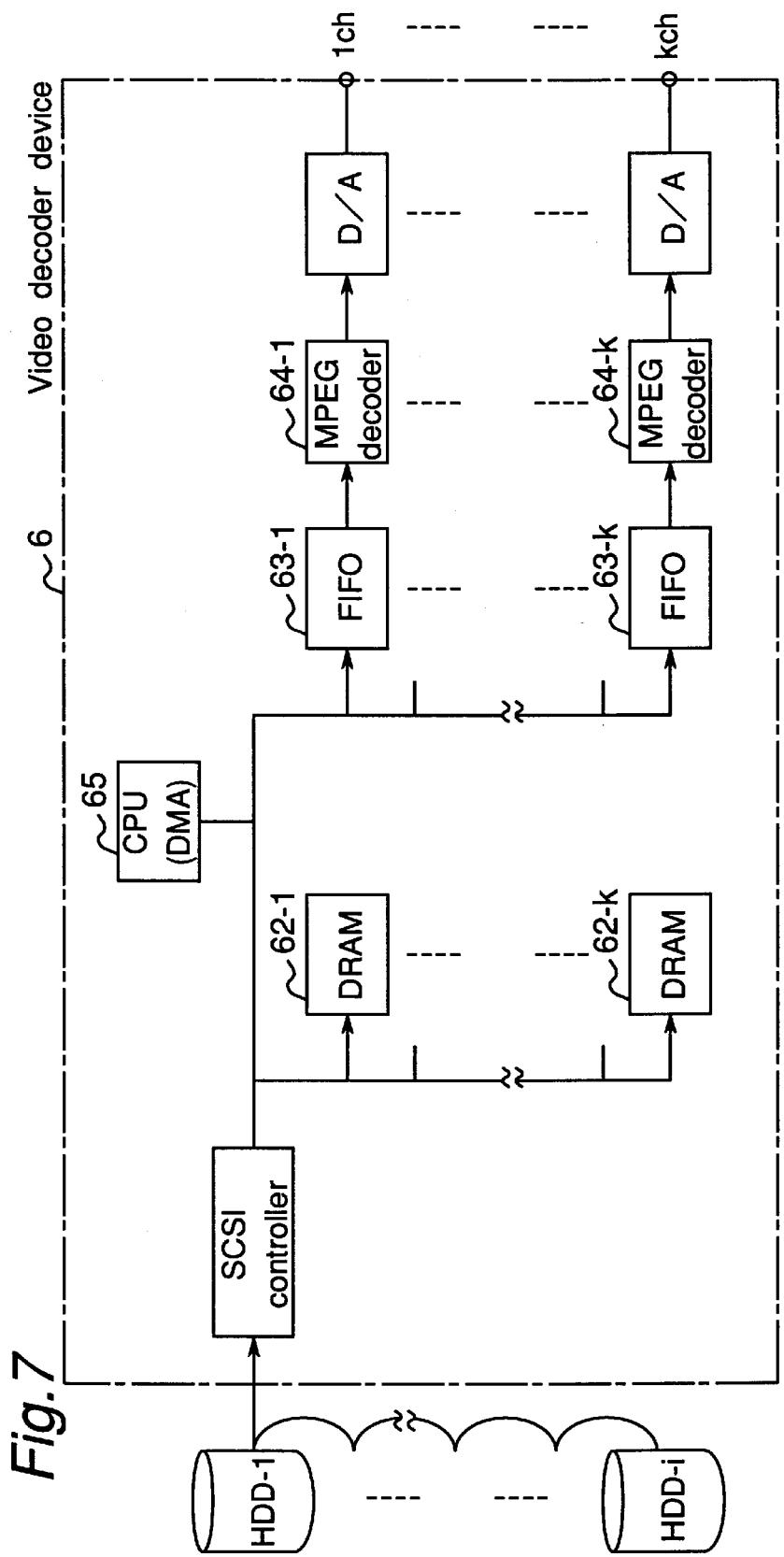
FIG. 7 is a block diagram showing an essential construction of a video decoder device according to the present invention.
Figure 8:
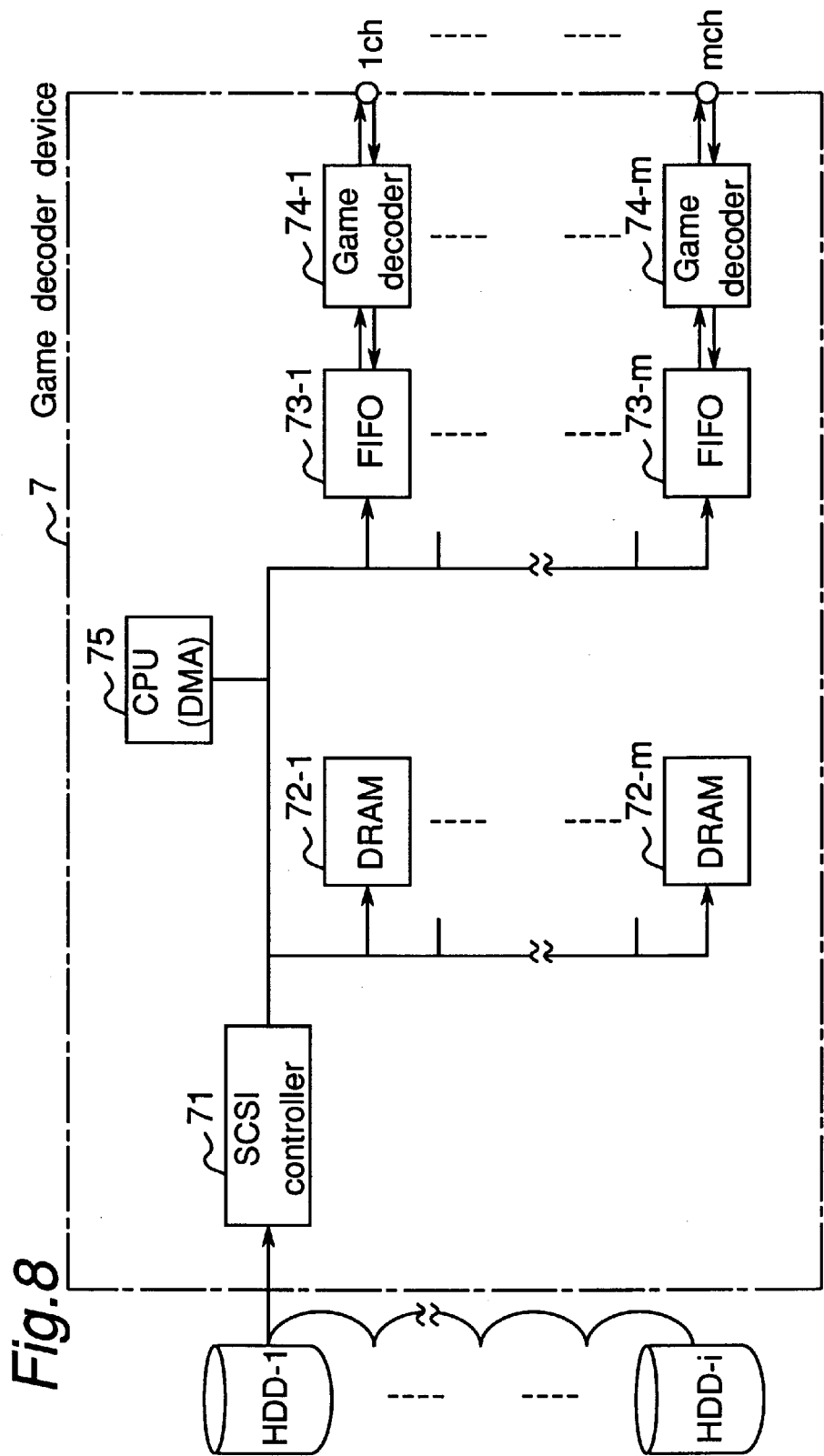
FIG. 8 is a block diagram showing an essential construction of a game decoder device according to the present invention.

In the present embodiment, the control device 8 disperses and writes digital data files of video softs and game softs at every constant blocks to the HDD 9 in accordance with a given rule (RAID 0). The digital data files of the video/game softs stored in the HDD 9 in dispersion are read out by the video decoder device 6 and game decoder device 7 respectively and stored in integrated memories (D-RAM), and in the respective decoder devices 6 and 7, the arrangement of the read-out data is restored to the original state, so that the data is continuously generated for reproduction output using first-in first-out memory devices FIFOs etc. as shown in FIGS. 7 and 8.

Every time the control device 8 receives a reproduction designation command designating any one of the stored plurality of video/game softs data files from the external host computer 1, the control device 8 designates a data file of one soft corresponding to the command to the video decoder device 6 or the game decoder device 7, and also designates a vacant channel number. It is noted here that the designation of a vacant channel number may be transmitted to the control device 8 together with the reproduction designation command by the host computer 1.

As described above, any plurality of video/game softs are previously stored in dispersion in the HDD 9 via the control device 8, and the management information such as titles and recording positions in the memory map of the HDD 9 of the plurality of video/game softs are automatically built up and registered by the control device 8 at the time of writing operation. These management informations are transferred to the video/game decoder devices 6 or 7 and held in common between the control device 8 and the video or game decoder devices 6 or 7. The commonly held management information contains a usage condition of each channel of the video/game decoder devices 6 and 7 and other additional information.

In addition, when the control device 8 receives an adding/renewing command requesting adding/renewing of a data file of a new video/audio soft from the host computer 1 also during a reproduction operation of a video/audio soft, the control device 8 in response thereto checks whether there is a spare room or not for data transfer to the HDD 9, based on the reproduction condition, transfer rate and data storage capacity etc. of the current video/audio soft.

When the HDD 9 has a spare room for transfer, the control device 8 reply the effect to the host computer 1, and confirms/registers the data file name of the video/audio soft to be added/renewed, and receives the data input of the soft through a data input portion I to perform the adding/renewing operation to the HDD 9. The adding/renewing of data is carried out in a period when the decoder device 6 or 7 reads the data from the HDD 9.

When it is judged that the HDD 9 has no spare room for data transfer, a reply is sent to the host computer 1 such that the adding/renewing command is to be retransmitted after a predetermined time lapse when the presence of a spare room for transfer is guessed based on the present reproduction condition of the video/audio soft.

Now, the above judgment as to whether a spare room for transfer exists or not is carried out by a procedure as described below.

Namely, as to a transfer rate of contents etc. of each video data and game data, since the contents information is also registered at the same time of registering the file name, the present band width is calculated from the present file under being reproduced and the number of channels. Since the maximum band width of the system is a predetermined value, the degree of spare room of the band width is calculated by subtracting the present band width in use from this. When this value is larger than the band width to be required at the time of recording by the HDD, the recording of the contents is carried out. When smaller, it is informed that the recording can not be carried out. As to when the channel in present use is to be finished in usage, the program time is calculated from the file information while the time lapse from the start of usage is cared by a timer or the like, whereby it is calculated how long time it takes thereafter to finish in usage. Thus, it is calculated how many minutes it takes thereafter to generate a spare room. It is informed to the host computer that the retry is possible after the calculated time lapses.

In the contents information mentioned above, there are contained video/game menus relating to the contents and MPEG information (MPEG 1, 2, transfer rate and frame etc.) and a file size as a method of compression, and the system is always used under the condition as discussed below. Namely:

maximum band width in system≧band width when reproducing plural channels+band width when recording Also, when a video/audio soft is added/renewed, the management information mentioned above is automatically added/renewed and transferred to the video/game decoder device 6 or 7.

The video decoder device 6 is constructed so as to generate video soft data simultaneously in parallel with a plurality of channels 1 through k, and also the game decoder device 7 is similarly constructed so as to generate game soft data simultaneously in parallel with a plurality of channels 1 through m, so that the data files of the video/game softs successively designated by the control device 8 are intermittently read out in time division from the HDD 9 every predetermined blocks in accordance with the respective management information and stored respectively in the built-in internal memories (DRAM). The data read out of the respective DRAM is decoded and continuously outputted as a video/audio signal from a channel of a designated number.

It is noted here that, as a capacity of each of the DRAM in the present embodiment, 256 kB×1 (Mbps), 256 kB×2 (Mbps), 256 kB×n (Mbps) where n is an integer, or other various capacity values may be appropriately used.

The switch 3 receives a control command from the host computer 1 to connect circuit lines by optionally combining the respective channels of the video/game decoder device 6 or 7 with the respective terminal devices 4.

Herein, the following explains an essential construction of the video decoder device 6 with reference to FIG. 7.

The video decoder device 6 shown in FIG. 7 accommodates a plurality of MPEG decoders 64-1 through 64-k (represented by "64"), corresponding to the respective output channels (1 through k), serving as a data extending means for extending and thawing digital data of a video soft coded by compression in accordance with e.g. MPEG 2. In FIG. 7, the data intermittently read out in time division from a plurality of HDDs 9 every predetermined blocks is stored in DRAMs 62 via a SCSI controller 61 and read out via corresponding FIFOs 63 each having a capacity of e.g. 4 kB, and then decoded by the MPEG decoders 64 so as to be D/A converted, and thereafter outputted from the respective designated output channels and transferred to the switch 3. Herein, each unit within the video decoder device 6 is generally controlled by a DMA (direct memory access) microcomputer (CPU) 65.

Namely, in order to intermittently read out in time division the data stored in dispersion every blocks in any plural HDDs 9 corresponding to respective channels to be decoded for continuously generating for reproduction a video soft from each channel, the video decoder device 6 includes the microcomputer (CPU) 65 for generally controlling the whole parts of the device and the WIDE-SCSI interface 61 as a WIDE-SCSI control means, and further includes DRAMs 62 as a semiconductor memory means for temporary memory of soft data, FIFOs 63 as the first-in data first-out memory devices and MPEG decoders 64 as the respective decoder means etc. corresponding to the respective channels, and further includes elements such as a semiconductor memory SRAM (not shown) having a capacity of e.g. 8 Mb for storing management information etc. and a semiconductor memory EPROM (not shown) for storing various softwares, etc. In such an arrangement, the timings of reading out the data from the HDDs 9 are defined so that the reading operations through a plurality of channels are not crossed.

Namely, in the construction mentioned above, a pair of FIFOs are arranged in parallel between a pair of temporary storing semiconductor memory DRAMs and MPEG decoders, whereby parallel data is converted to serial data and the data intermittently read out from the above mentioned pair of temporarily storing semiconductor memory can be continuously supplied to the MPEG decoders.

Similarly, as shown in FIG. 8, the game decoder device 7 accommodates a plurality of game decoder elements 74 corresponding to the respective output channels (1 to m) for changing the game soft data to be played in response to the operation of the pad, and as the FIFOs 73, bi-directional ones are used for transferring data from the main CPU side to the game decoder side and also transferring data from the game decoder side to the CPU side. Since the other components and operations thereof are the same as those of FIG. 7, the detail explanation thereof is omitted here.

Figure 2:
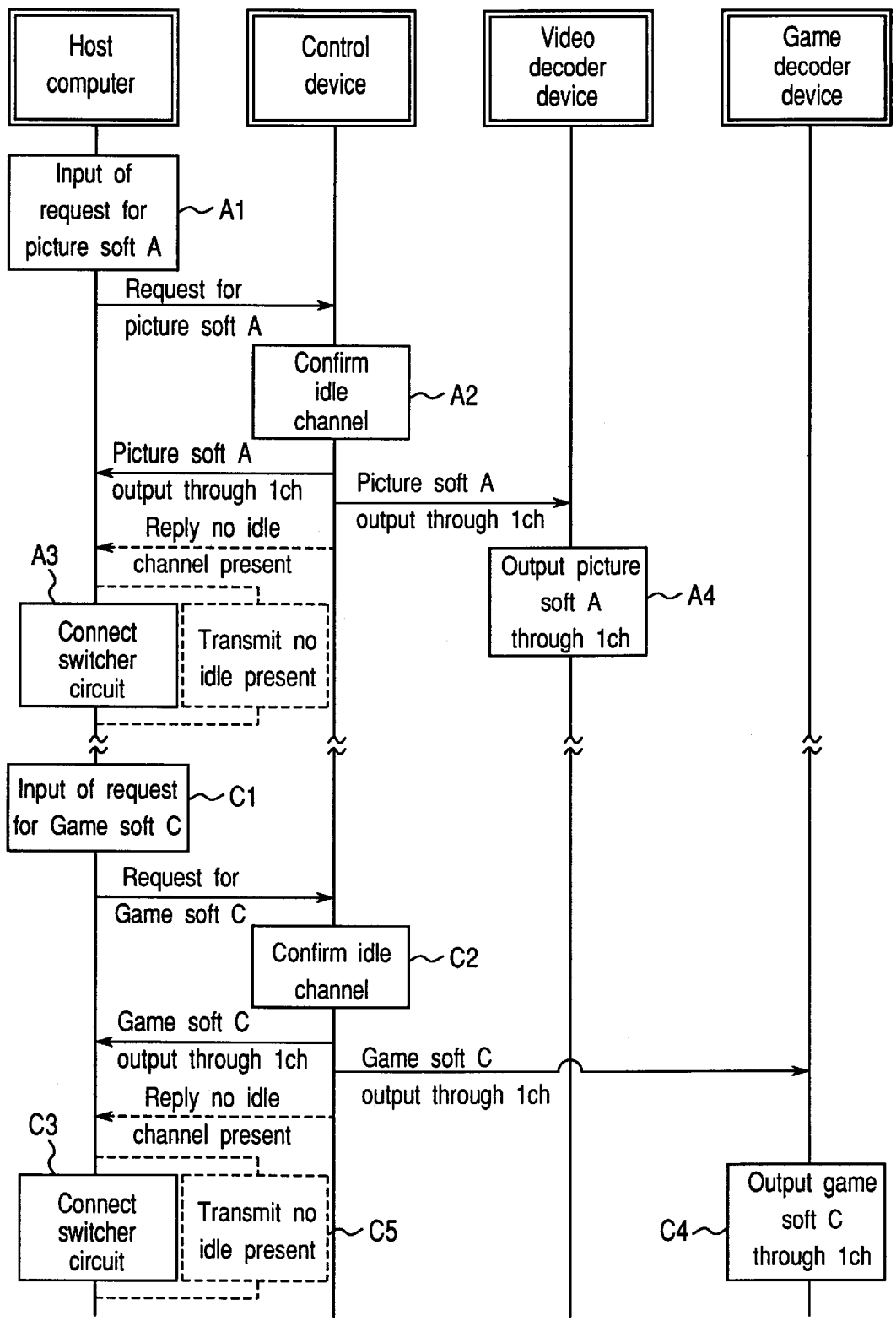
FIG. 2 is a schematic view explaining a reproduction operation of a soft according to the present invention.

In the embodiment mentioned above, the following describes a reproduction procedure of a video soft or game soft with reference to FIG. 2.

As described above, data files of a plurality of video/game softs are previously stored in the HDDs 9 by the control device 8 in a state of being dispersed every blocks (e.g., RAID0 0), and the management information such as titles and storage positions of the soft registration data have been already managed in common by the control device 8 and the video/game decoder devices 6 and 7 when recording to the HDDs 9, having a construction capable of directly accessing to the HDDs 9.

It is assumed a case that, by operating e.g. a set-top box 12-1 of a terminal device 4-1 of any of the video/audio terminals 4, a request for data reproduction of a video soft A is transmitted as command to the host computer 1 via the switch 3. The host computer 1 receives the request for the soft A and sends the request to the control device 8. (Step A1)

The control device 8 which received the request of the soft A checks, based on the management information whether or not a spare room exists in the decoder device 6 (Step A2), and commands the video decoder device 6 to output the soft A from e.g. a channel 1 and informs the effect to the host computer 1 and registers as a management information that the channel 1 of the decoder device 6 is in usage (busy), which the management information is held in common by the device 8 and the device 6. The host computer 1 controls the connecting state of the switch 3 so that the circuit lines of the terminal device 4-1 which is a source of generating the request and the channel 1 of the decoder device 6 are connected. (Step A3)

The decoder device 6 executes random-access to the soft A stored in dispersion in at least two or more HDDs of the plural HDDs 9 to read the data and decodes the data to restore the original video soft A which is outputted from the channel 1. (Step A4)

As a result, the soft A outputted for reproduction from the channel 1 of the decoder device 6 is transferred to the terminal device 4-1 via the switch 3 and displayed on the television monitor 11-1 with the audio thereof generated from a speaker attached thereto. Thus, the soft A can be appreciated at the side of providing the terminal device 4-1.

If the channels of the decoder device 6 are all in usage, it is judged in Step A2 that there is no vacant channel, and replies to the host computer 1 the effect that the soft A can not be appreciated due to no spare room, and the host computer 1 transmits the effect to the terminal device 4-1 via the switch 3.

Nextly, it is assumed a case that, during the reproduction transfer of the video soft A, a reproduction request for another video soft B is transmitted as command to the host computer by operating e.g. a set-top box 12-n of a terminal device 4-n. The host computer receives the request for the soft B and transmits to the control device 8. The control device 8 having received the request acts similarly to the above, and when a vacant channel exists in the video decoder device 6, the soft B is transferred to the terminal device 4-n from the data processing device 2. If there is no vacant channel, the effect is transmitted to the corresponding terminal device 4-n.

In this case, the video decoder device 6 has such a construction as to read out in time division the video soft data every blocks by random access stored in dispersion in the plural HDDs 9, and the rate of reading out of the HDDs 9 and the number of the channels of the decoder device 6 are designed with a spare room both in the case of reproducing different video softs through all of the output channels of the video decoder device 6 and in the case of reading out the same video soft corresponding to all of the output channels number every blocks in time division to be decoded. Therefore, the reading conditions are the same both in the case of reading out the same video soft and in the case of reading out different video softs from the respective channels of the decoder device 6, and even if the requests are partially concentrated to a specific video soft, the requests for reproduction can be coped so long as the decoder device 6 has a vacant channel.

Nextly, it is assumed a case that, during the reproduction transfer of the video soft A, a reproduction request for a game soft C is transmitted as command to the host computer by operating e.g. a set-top box 12-2 of a terminal device 4-2.

The host computer receives the request for the game soft C (Step C1 in FIG. 2) and transmits the request to the control device 8. In the control device 8, it is checked whether or not there exists an idle channel in the game decoder device 7 based on the management information (Step C2) and when e.g. channel 1 is confirmed to be vacant in the decoder device, it is commanded to output from the channel 1, and the effect is informed to the host computer and informs the effect to the host computer 1 and it is registered in common by the control device 8 and the decoder device 7 as a management information that the channel 1 of the decoder device 7 is in usage.

The host computer controls the connecting state of the switch 3 so that the circuit lines of the terminal device 4-2 which is a source of generating the request and the channel 1 of the game decoder device 7 are connected (ON) (in Step C3).

The decoder device 7 reads out the data of soft C stored in dispersion in at least two or more HDDs of the HDDs 9, and the data of the game soft C restored through the decoding process by the respective game decoder elements 74 is outputted from the channel 1.

As a result, the game soft C outputted for reproduction from the channel 1 is transferred to the terminal device 4-2 via the switch 3 and the game soft C is displayed on the television monitor 1-2 with the audio thereof generated from a speaker attached thereto, and thus, the game can be played using the game pad 13-2.

If the channels of the game decoder device 7 are all in usage, the effect is replied to the host computer that there is no vacancy and it is impossible to play, and the host computer transmits the effect to the terminal device 4-2 via the switch 3 (Step C5).

Nextly, it is assumed a case that, during the reproduction transfer of the game soft C to the terminal device 4-2, a reproduction request for another game soft D is transmitted as a command to the host computer by operating e.g. a set-top box 12-3 of a terminal device 4-3. The host computer receives the request for the soft D and transmits to the control device 8. The control device 8 having received the request acts similarly to the above, and when a vacant channel exists in the game decoder device 7, the soft D is transferred to the terminal device 4-3 from the data processing device 2. If there is no vacant channel, the effect is transmitted to the corresponding terminal device 4-3.

As to the setting of the channel number of the game decoder device 7, the rate of reading out of the HDDs 9 and the number of the channels of the decoder device 7 are set with spare room both in the case of reproducing different game softs through all of the output channels of the game decoder device 7 and in the case of reading out the same game soft corresponding to the entire output channel numbers in time division every blocks to be decoded. Therefore, the reading conditions are the same both in the case of reading out the same game soft and in the case of reading out different game softs from the respective channels of the decoder device 7, and even if the requests are partial to a specific game soft, the requests for reproduction can be coped with so long as the decoder device 7 has a vacant channel, which is similar to the case of the video decoder device 6.

As described above, in the present embodiment, when optional plural terminal devices 4 request for reproduction of video/game softs to the host computer, the data of the requested softs can be read out of the HDDs 9 to be decoded and can be reproduced for supply to the plural terminal devices which are sources of generating the requests so long as there exists a vacant channel capable of reproducing the requested softs in the video decoder device 6 or game decoder device 7.

Moreover, when a command of stopping reproduction (or play) of a soft is inputted to the host computer from a terminal device 4 during the reproduction operation of the soft, the effect is transmitted to the control device 8, which controls the switch 3 so as to open (turn off) the circuit line connection to the terminal device which has generated the stop command. Then, the control device 8 stops the output of the corresponding soft to the decoder device 6 or 7 in response to the receipt of the stop command and registers the effect as the management information.

Figure 3:
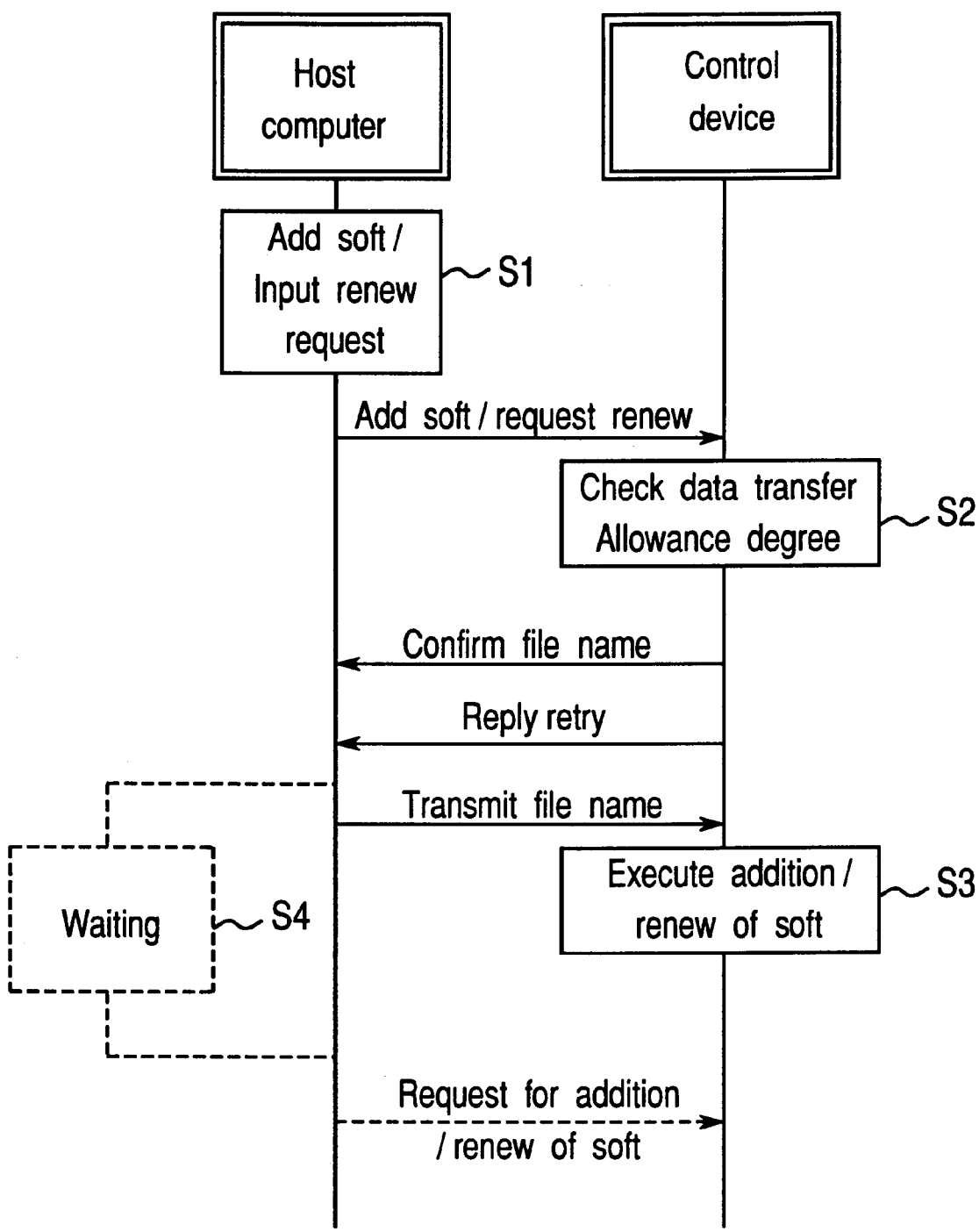
FIG. 3 is a schematic view explaining an operation of adding and renewing a soft according to the present invention.

Next, a procedure of adding/renewal of a video or game soft will be described with reference to FIG. 3.

As described above, a plurality of video/game softs are previously stored in the plurality of HDDS 9 in dispersion every blocks based on a rule (e.g., RAID 0), and the soft registration data, i.e., titles and storage positions of the softs etc. are automatically registered as the management information at the time of recording so as to directly access to the HDDs 9 respectively. Moreover, in order to distinguish the data stored in the respective HDDs 9, the data files are distinguished with expansion factors of the file names in accordance with differences etc. of sorts of the data or compression algorithm. For example, **.MP1 is used in the case of a video soft (MPEG 1) and .MP2 is used in the case of a video soft (MPEG 2) and .3DO is used in the case of a game soft. Herein, ** is an appropriate symbol.

First, when the host computer 1 is applied with a request for adding/renewal of a soft (Step S1), the request is transmitted to the control device 8. The control device 8 having received the adding/renewal request of the soft checks the reproduction condition (degree of spare room for data transfer) in the data processing device 2 from the registered management information (Step S3 in FIG. 3) and varies the operation in accordance with the degree of the spare room for data transfer. That is, when there is a degree of the data transfer spare room, the adding/renewal of the soft is received and confirms the file name of the adding/renewal soft to the host computer. Thereby, the host computer transmits the file name to the control device 8.

The control device 8 writes in dispersion the adding/renewal soft data, which is intermittently inputted every blocks from the data input portion I, into the plural HDDs 9 (Step S3). This writing operation can be executed taking advantage of an interval during which the video/game decoder device 6 or 7 reads each soft data.

On the other hand, when there is no spare room degree for data transfer, a reply is transmitted to the host computer to retry after a time lapse when the spare room degree is predicted, and becomes a waiting mode (Step S4).

By the operating procedure mentioned above, a new soft can be added/renewed even during the reproducing operation of the video/game soft, and the management of the soft can be automatically attained.

Next, as to the data transfer flow of reading out the data stored by dispersion every blocks in any two or more HDDs 9 and transmitting to the MPEG decoder 64 in the video decoder device 6 shown in FIG. 7, the first embodiment thereof will be described with reference to the timing chart of FIG. 4.

For a brief explanation, it is assumed a case where data corresponding to a video picture continual for several seconds is divided into e.g. four and stored in dispersion every blocks in the four HDDs 1 through 4, the data of the video soft A and soft B is alternately written by a pair of temporary storage semiconductor memories RAM 1A and RAM 1B, and when the transfer rate is e.g. 4 Mbps, a memory per one channel is 256 kB×4 (Mbps), and the DRAM writes data of 1 MB in amount corresponding to four blocks in the first writing, and thereafter, when the data of 256 kB is run out of in the writing operation, data of 256 kB is read out of the HDD, and thus the writing/reading operations are alternately repeated every 256 kB so that the reading is intermittently executed by time division every given blocks.

As shown in FIGS. 4(a)–(f), the reading of data from a pair of temporary storage semiconductor memories RAMs 1A and 1B is finished at the time $t_0$, and there gives a command to successively reads out the data of the video soft A corresponding to a video picture continual for several seconds from the four HDDs 1–4 at the time $t_1$. The HDDs 1–4 starts a seeking operation upon receipt of this reading command, and then at the time $t_2$ when a predetermined seeking operation time is lapsed and thereafter the reading of the data of the video soft A corresponding to a video picture continual for a several seconds from the HDDs 1–4 is started. In this case, the seeking operations of the HDDs 1–4 are carried out in parallel, and the reading of the data is carried out in turns from that having prepared for the data transfer of the HDDS 1–4 to receive data of e.g. every 256 kB, and then sequentially written into one (RAM-1A) of a pair of temporary storage semiconductor memories in the period between time $t_2$ to time $t_6$ as shown in FIG. 4(e). Thus, the data corresponding to 1 MB in total of the four blocks is written in the first writing.

Figure 4:
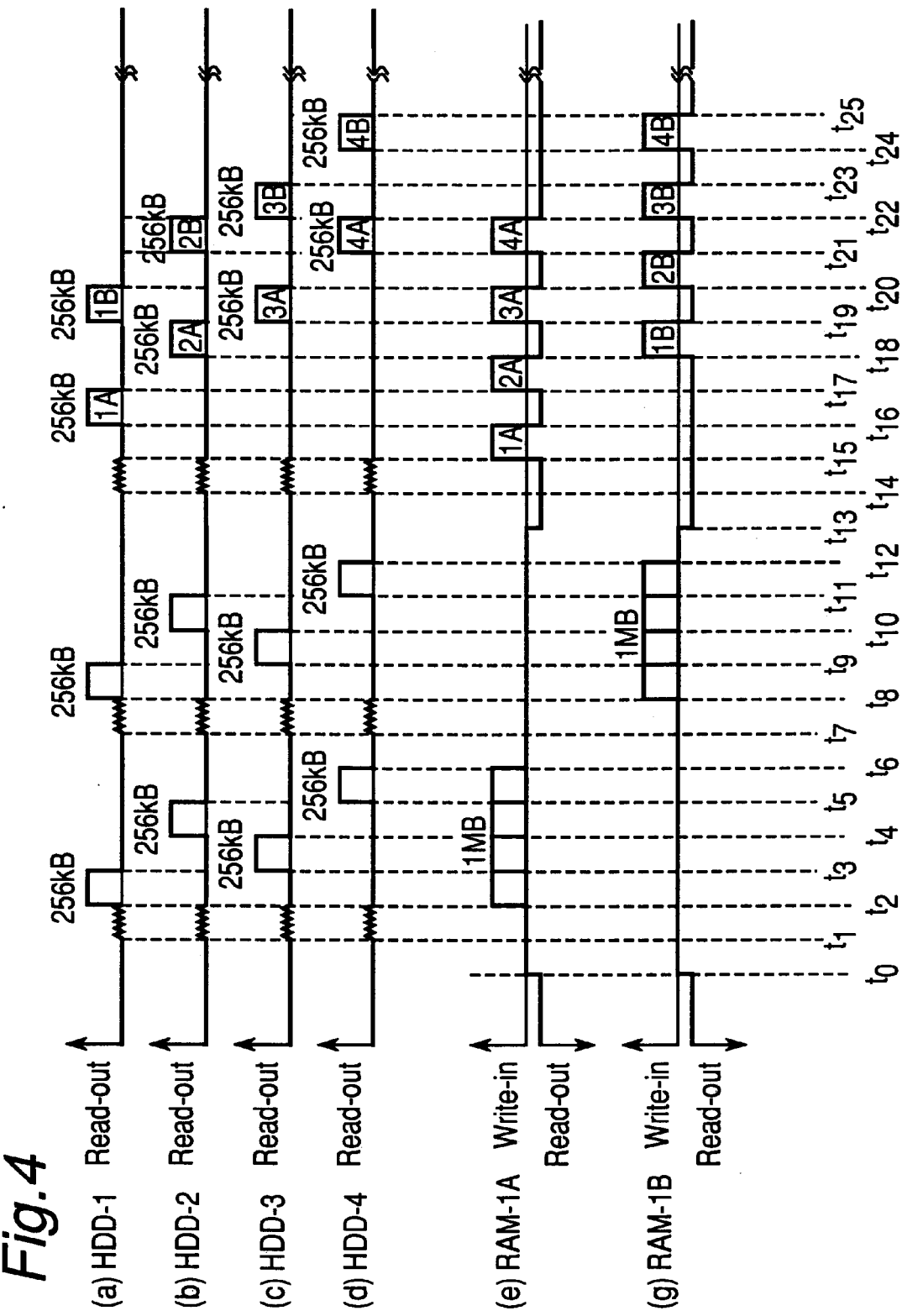
FIG. 4 is a timing chart explaining a first embodiment of an operation of reading video data according to the present invention.

In the example of FIG. 4, although the data is read out of the HDD-1 in the period of $t_2$–$t_3$, read out of the HDD-3 in the period of $t_3$–$t_4$, read out of the HDD-2 in the period of $t_4$–$t_5$, and read out of the HDD-4 in the period of $t_5$–$t_6$, the reading order of each HDD is optional.

Figure 6:
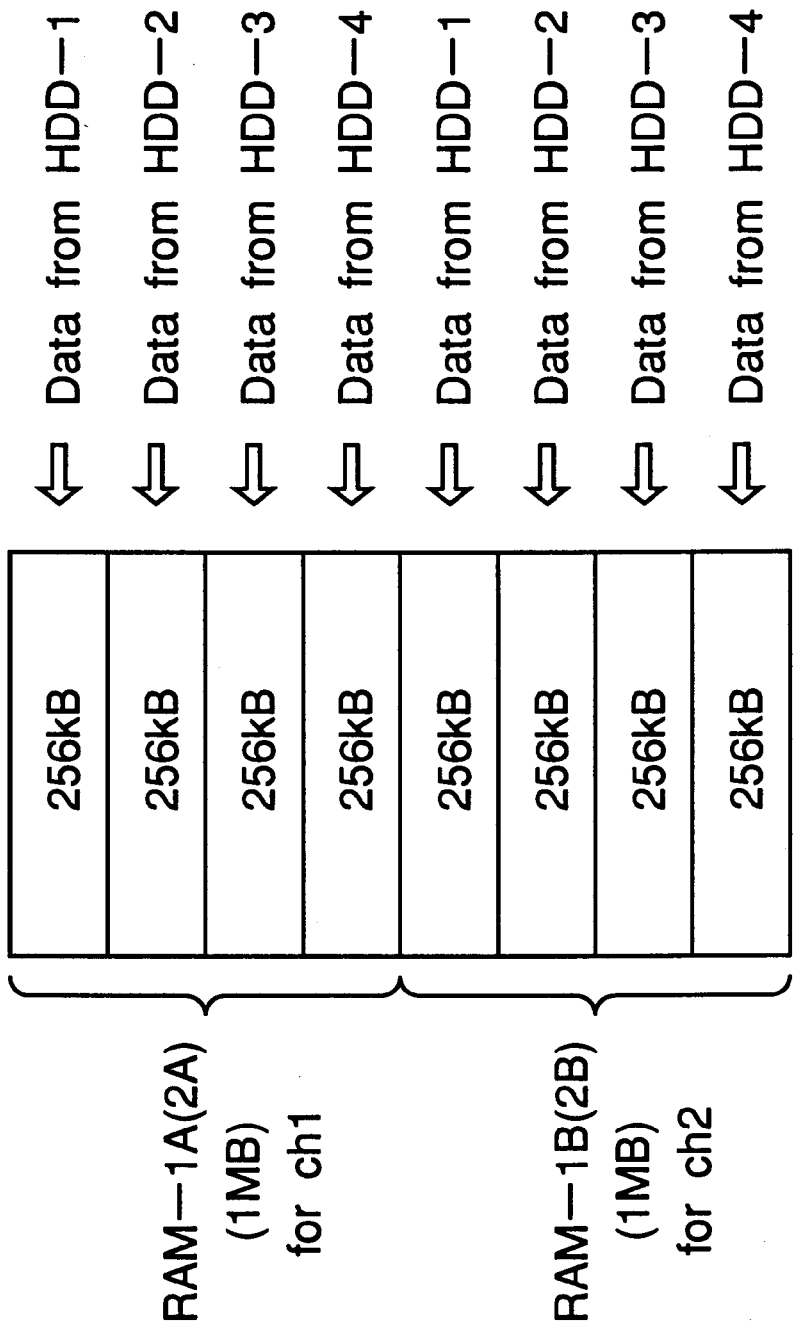
FIG. 6 is a schematic view showing a memory map corresponding to two channels in an internal memory of a decoder device according to the present invention.

In this case, the data read out from the HDDS 1–4 is transferred to each DRAM 62 shown in FIG. 7 and is temporarily stored in a predetermined region indicated by an upper half of the memory map shown in FIG. 6, for example, four 256 kB blocks (1 MB in total) corresponding to RAM 1A for channel 1.

Referring back to FIG. 4, there is given a command of sequentially reading the data of the video soft B corresponding to a video picture continual for several seconds from the four HDDS 1–4 at the time $t_7$, and the HDDs 1–4 starts a seeking operation upon receipt of the reading command, and starting the reading of the data of the video soft B corresponding to a video picture continual for several seconds from the HDDS 1–4 after the time $t_8$ when the predetermined seeking operation time is elapsed. In this case, the seeking operations of the HDDS 1–4 are carried out in parallel, and the reading of the data is carried out in turns from that having prepared for the data transfer of the HDDS 1–4 to receive data of e.g. every 256 kB, and then sequentially written into one (RAM-1B) of a pair of temporary storage semiconductor memories in the period between time $t_8$ to time $t_{12}$ as shown in FIG. 4(f).

In the example of FIG. 4, although the data is read out of the HDD-1 in the period of $t_8$–$t_9$, read out of the HDD-3 in the period of $t_9$–$t_{10}$, read out of the HDD-2 in the period of $t_{10}$–$t_{11}$, and read out of the HDD-4 in the period of $t_{11}$–$t_{12}$, the reading order of each HDD is optional.

In this case, the data read out from the HDDS 1–4 is transferred to each DRAM 62 in a similar manner to that of the soft A and is temporarily stored in a predetermined region indicated by a lower half of the memory map shown in FIG. 6, for example, four 256 kB blocks (1 MB in total) corresponding to RAM 1B for channel 2.

Next, as to the writing operations at the second time and thereafter, the respective RAM-1A and RAM-1B alternately repeat the reading and writing as shown in time $t_{13}$–time $t_{25}$. That is, in the example of FIG. 4, in RAM-1A the data of the soft A is written between the time $t_{15}$ and the time $t_{16}$ by reading the data of 256 kB from the HDD-1, and subsequently the data is read out from RAM-1A between time $t_{17}$ and time $t_{18}$, written between times $t_{17}$–$t_{18}$, read out between times $t_{18}$–$t_{19}$, written between times $t_{19}$–$t_{20}$, read out between times $t_{20}$–$t_{21}$, and written between times $t_{21}t_{22}$, and thus after the second time, when the data of 256 kB is run out of in the data writing operation into the MPEG decoder, data of 256 kB is read out of the HDD, and thus the writing/reading operations are alternately repeated by each RAM so that the reading is intermittently executed by time division every given blocks.

Similarly as to the soft B. the writing/reading of data of 256 kB are alternately repeated by RAM-12 as indicated by e.g. $t_{18}$–$t_{25}$ of FIG. 4(f).

The data temporarily stored in each DRAM 62 is sequentially and consecutively read out every capacity of a corresponding FIFO 63 of e.g. 4 kB and transferred to a corresponding MPEG decoder 64.

When a further request for reading out of a video soft is performed, the reading of the data is carried out from HDDS 1–4 at the timings similar to those mentioned above, and written into a pair of temporary storage semiconductor memories, and thereafter transferred to MPEG decoder 64 so that the video soft data is outputted from the allocated channel. This means that, the video soft data corresponding to the channel is automatically read out from a plurality of HDDs when a stop command is inputted from the terminal device 4 or at the time of ending the reproduction of the video soft, irrespective of the request starting times for the video soft being the same or different, and the operation thereafter is finished.

It is noted here that, in the present embodiment, 256 kB×1 (Mbps), 256 kB×2 (Mbps), or 256 kB×n (Mbps) where n is an integer and other various capacities can be appropriately used as the capacity of each DRAM as mentioned above.

SECOND EMBODIMENT

Nextly, a second embodiment of a data transmission method of reading out data stored in dispersion in HDDs 9 and transmitting the data to MPEG decoders 64 will be described with reference to the timing chart shown in FIG. 5.

Figure 5:
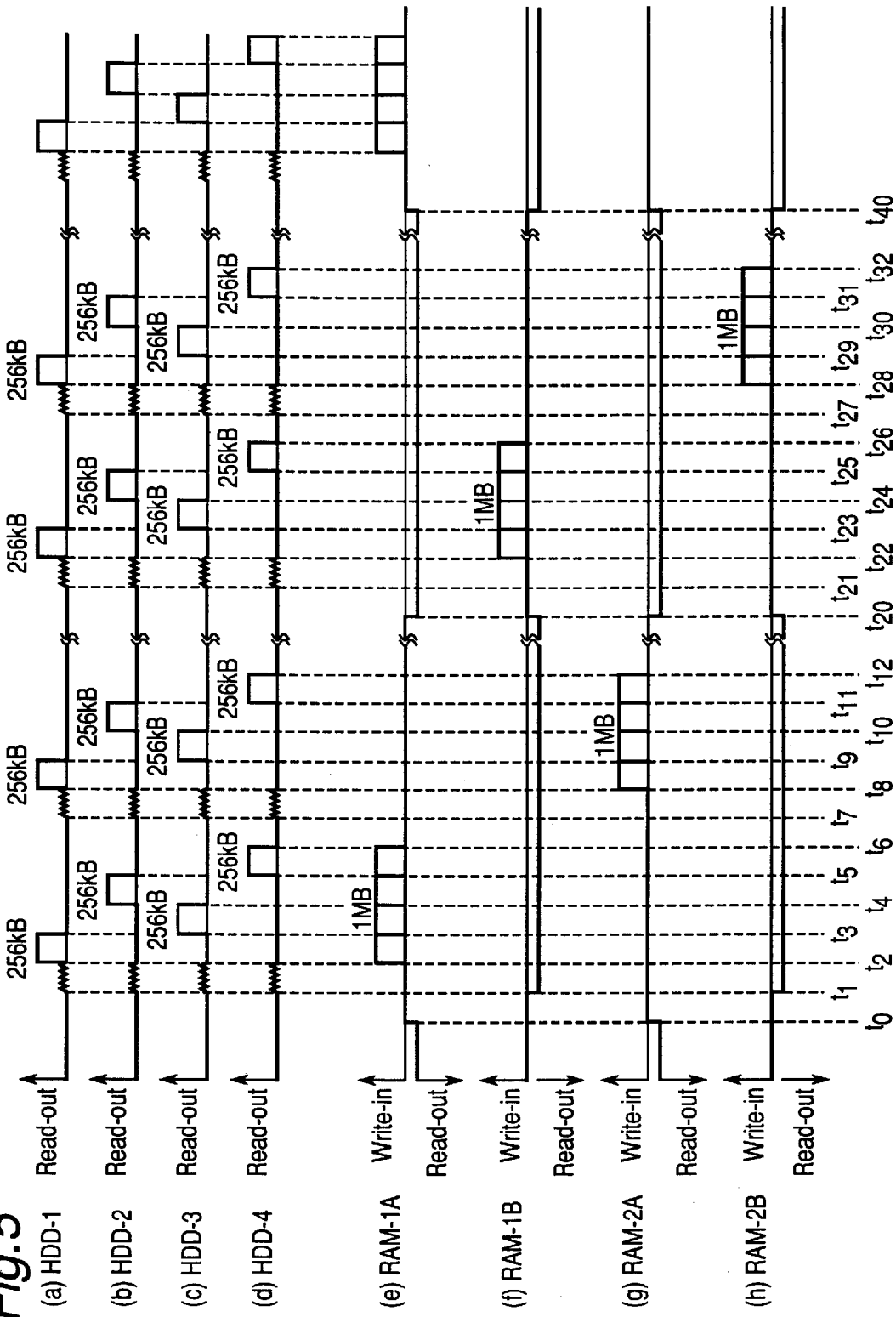
FIG. 5 is a timing chart explaining a second embodiment of an operation of reading video data.

Since the second embodiment shown in FIG. 5 is similar to the first embodiment shown in FIG. 4 except for the matter that the data of the video soft A is alternately written by a pair of temporary storage semiconductor memories RAM 1A and RAM 1B while the data of the soft B is alternately written by another pair of semiconductor memories RAM 2A and RAM 2B, therefore the explanation of the overlapped portion is omitted here.

As shown in FIGS. 5(a)–(d), the reading out of the data from one side RAMs 1A and 2A of a pair of temporary storage semiconductor memories is ended while the reading out of the data from the other temporary storage semiconductor memories RAM 1B and RAM 2B is started, and there is given a command of successively reading out the data of the video soft A corresponding to a video picture continually for several seconds from the four HDDS 1–4 at the time $t_1$. The HDDS 1–4 start the seeking operation upon receipt of the reading command, and the reading out of the data of the video soft A corresponding to a video picture continually for a several seconds from the HDDS 1–4 is started after the time $t_2$ when a predetermined seeking operating time is elapsed. In this case, the seeking operations of the HDDS 1–4 are carried out in parallel and the seeking time as a whole takes a time corresponding to approximately one HDD, and the reading of the data is carried out in turns from that having prepared for the data transfer of the HDDS 1–4 to receive data of e.g. every 256 kB, and then sequentially written into one (RAM-1A) of a pair of temporary storage semiconductor memories in the period between time $t_2$ to time $t_6$ as shown in FIG. 4(e).

Next, there is given a command of successively reading out the data of the video soft B corresponding to a video picture continually for a several seconds from the four HDDS 1–4 at the time $t_7$, and the HDDS 1–4 start the seeking operation upon receipt of the reading command, and the reading out of the data of the video soft B corresponding to a video picture continually for several seconds from the HDDS 1–4 is started after the time $t_8$ when a predetermined seeking operating time is elapsed. In this case, the seeking operations of the HDDS 1–4 are carried out in parallel and the seeking time as a whole takes a time corresponding to approximately one HDD, and the reading of the data is carried out in turns from that having prepared for the data transfer of the HDDS 1–4 to receive data of e.g. every 256 kB, and then sequentially written into one (RAM-2A) of a pair of temporary storage semiconductor memories in the period between time $t_8$ to time $t_{12}$ as shown in FIG. 5(g).

Similarly as to another pair of RAM 1B, when the reading out of the data from RAMs 1B and 2B is ended, the reading out of the data from the other temporary storage semiconductor memories RAM 1A is started, and there is given a command of successively reading out the data of the video soft A corresponding to a video picture continually for several seconds from the four HDDS 1–4 at the time $t_{21}$. The HDDs 1–4 start the seeking operation upon receipt of the reading command, and the reading out of the data of the video soft A corresponding to a video picture continually for several seconds from the HDDS 1–4 is started after the time $t_{22}$ when a predetermined seeking operating time is elapsed. In this case, the seeking operations of the HDDs 1–4 are carried out in parallel and the seeking time as a whole takes a time corresponding to approximately one HDD, and the reading of the data is carried out in turns from that having prepared for the data transfer of the HDDS 1–4 to receive data of e.g. every 256 kB, and then sequentially written into one (RAM-1B) of a pair of temporary storage semiconductor memories as shown in FIG. 5(f).

In the example of FIG. 5, although the data reading is carried out from the HDD-1 in the period of $t_{22}$–$t_{23}$, the reading is carried out from the HDD-3 in the period of $t_{23}$–$t_{24}$, the reading is carried out from the HDD-2 in the period of $t_{24}$–$t_{25}$, and the reading is carried out from the HDD-4 in the period of $t_{25}$–$t_{26}$, the reading order of each HDD is optional.

In this case, the data read out from the HDDS 1–4 is transferred to each DRAM 62 and is temporarily stored in a predetermined region indicated by a lower half of the memory map shown in FIG. 6, for example, four 256 kB blocks (1 MB in total) corresponding to RAM 1B.

There is given a command of successively reading out the data of the video soft B corresponding to a video picture continually for several seconds from the four HDDs 1–4 at the time $t_{27}$. The HDDS 1–4 start the seeking operation upon receipt of the reading command, and the reading out of the data of the video soft B corresponding to a video picture continually for several seconds from the HDDS 1–4 is started after the time $t_{28}$ when a predetermined seeking operating time is elapsed. In this case, the seeking operations of the HDDS 1–4 are carried out in parallel and the seeking time as a whole takes a time corresponding to approximately one HDD, and the reading of the data is carried out in turns from that having prepared for the data transfer of the HDDS 1–4 to receive data of e.g. every 256 kB, and then sequentially written into one (RAM-2B) of a pair of temporary storage semiconductor memories as shown in FIG. 5(h).

In the example of FIG. 5, although the data reading is carried out from the HDD-1 in the period of $t_{28}$–$t_{29}$, the reading is carried out from the HDD-3 in the period of $t_{29}$–$t_{30}$, the reading is carried out from the HDD-2 in the period of $t_{30}$–$t_{31}$, and the reading is carried out from the HDD-4 in the period of $t_{31}$–$t_{32}$, the reading order of each HDD is optional.

In this case, the data read out from the HDDS 1–4 is transferred to each DRAM 62 and is temporarily stored in a predetermined region indicated by an upper half of the memory map shown in FIG. 6, for example, four 256 kB blocks (1 MB in total) corresponding to RAM 2B.

When the reading out of the data of the soft A (B) of RAM 1A (RAM 2A) is ended at the time $t_{40}$, the reading out of the data of the soft A (B) of the other memory RAM 1B (RAM 2B) is carried out, and when this is completed, the other memory RAM 1A (RAM 2A) starts the reading out of the data of the soft A (B), and thus the data writing of the video soft A and soft B into one pair RAMs 1A and 1B and the other pair RAMs 2A and 2B of the temporary storage semiconductor memories is alternately repeated respectively.

The writing of the data of the soft A (soft B) into one RAM 1A (RAM 2A) of a pair of semiconductor memories is carried out in a period when the video soft A (soft B) is not read out to the other channel within a period of reading out the data of the soft A (soft B) from the other semiconductor memories RAM 1B (RAM 2B), and similarly the writing of the data of the soft A (soft B) into the other RAM 1B (RAM 2B) is carried out in a period when the video soft A (soft B) is not read out to the other channel within a period of reading out the data of the soft A (soft B) from the other semiconductor memories RAM 1A (RAM 2A), whereby it becomes possible to continuously transmit the data of the video soft A (soft B) to the MPEG decoders 64 without interruption.

Next, when reading out of a video soft is further requested, the reading out of the data is carried out from HDDS 1–4 at the timings subsequent to $t_{12}$ and $t_{32}$ similarly to those mentioned above, and written into a pair of temporary storage semiconductor memories, and transferred to MPEG decoders 64 so that the video soft is outputted from an allocated channel. This means that, the video soft data corresponding to the channel is automatically read out from a plurality of HDDs when a stop command is inputted from the terminal device 4 or at the time of ending the reproduction of the video soft, irrespective of the request starting times for the video soft being the same or different, and the operation thereafter is finished.

In order to avoid a video soft and a game soft from being in mixture in one HDD, e.g. four of six HDDs are made exclusive for video soft while the remaining two are made exclusive for game soft, whereby reading check of HDD in the game decoder device 7 is made unnecessary to be performed in the video decoder device 6, alternatively data of video and game softs are present in mixture in a plurality of HDDS, of which construction is optional.

Next, when the control device 8 stores the input data of a video soft into HDDS 1–4, the input data is temporarily stored on DRAM represented by a memory map (256 kB×4) similar to the memory map shown in FIG. 6 and the data is sequentially transferred to the HDDS 1–4 in the order from that having prepared with the writing.

As to the game decoder device 7, only by replacing MPEG decoders 64 by the game decoder elements 74, the data transfer between HDD 9 and each game decoder element 74 is similar to that of the video decoder device 6, and therefore the explanation thereof is omitted here.

INDUSTRIAL APPLICABILITY

As described above, according to an embodiment aspect of the present invention, digital data of a plurality of video/audio softs is previously stored in dispersion in a random-accessible non-linear large capacity storage means (HDD9), and a video decoder device and game decoder device 7 intermittently read out a requested and designated video/game soft every predetermined blocks from the large capacity storage means by time division to be temporarily stored in an internal memory, and read out from the internal memory to be decoded, and continually output as a video/audio signal from a channel of a number designated by the control device 8, and therefore the output data of any soft can be supplied to the terminal devices 4, irrespective of whether the requested soft is the same or different, and irrespective of supply starting time, so long as the number of the output channels of the data processing device 2 is allowed, and the softs can be supplied to a number of terminal devices of which the number is beyond the number of the prepared softs. Moreover, even when the requests are concentrated to a specific soft, the access of the soft can be performed in a short time, and it may be sufficient to merely prepare a small capacity memory in the video decoder device 6 and game decoder device 7, so that the cost of the decoder devices can be reduced.

Moreover, the control device 8 examines the presence or absence of spare room for data transfer to the large capacity storage means 9 based on the data reproduction condition of a video/audio soft according to an adding/renewal command, and when there is a spare room for transfer, the file name of the soft to be added/renewed is confirmed and the video/audio soft data to be added/renewed is received in an interval in which the video decoder device 6 and game decoder device 7 read the data from the large capacity storage means 9 to perform the adding/renewal of the soft in the large capacity storage means 9, therefore the adding/exchange of a soft can be automatically carried out and also the management of the soft can be automatically carried out.

Moreover, since the video soft data is stored in the large capacity storage means 9, many sorts and long period video softs can be stored in the large capacity storage means 9 and can be coped with requests for various video softs, and the game softs can be freely played by operating the game pad 13 provided on each terminal device 4.

What is claimed is:

1. An information processing device in a multi-channel data transfer network wherein said information processing device serves as a data supply side, comprising:

random-accessible large capacity storage means for storing digital data of a plurality of video/audio softs, previously allocated to channels, every predetermined blocks in dispersion, wherein the stored digital data can be a combination of conventional video contents and game contents;

control means having management information which indicates file names of the plural video/audio softs, recording positions in said random-accessible large capacity storage means, and allocated channel numbers, receiving a request for designating reproduction of any one data of the plural video/audio softs from an external, and designating reproduction of a data file of one video/audio soft corresponding to the request of reproduction-designated to said random-accessible large capacity storage means every time the request command is inputted; and decoder means having a plurality of output channels simultaneously outputting video/audio soft data in parallel, registering the management information transferred from said control means, directly accessing the random-accessible large capacity storage means to intermittently read out the video/audio soft data designated by said control means from said random-accessible large capacity storage means based on the management information, every blocks in dispersion to be decoded, and thereafter continuously outputting the requested video/audio soft data in analog form from a channel of a designated number.

2. The information processing device as claimed in claim 1, wherein said control means previously writes the digital data file of the video/audio softs every predetermined blocks in dispersion into said random-accessible large capacity storage means in accordance with a given rule.

3. The information processing device as claimed in claim 1, wherein, every time said control means receives a request for reproduction-designating data of any one of the plural video/audio softs from an external, said control means designates one vacant channel number in response to the request for reproduction designation.

4. The information processing device as claimed in claim 1, wherein said decoder means accommodates a plurality of temporary storing devices for temporarily storing the digital data of the video/audio softs read out from said random-accessible large capacity storage means, a plurality of data extending devices arranged in parallel corresponding to said plurality of temporary storage devices for extending and restoring the read out data, corresponding to the number of channels, and a pair of first-in first-out memories arranged in parallel between said respective temporary storage devices and data extending devices converting parallel data to serial data, thereby continuously supplying the data intermittently read out from said pair temporary storage devices to said data extending devices.

5. The information processing device as claimed in claim 2, wherein the management information is automatically produced and registered by said control means at the time of writing the video/audio soft data, and the management information is transferred to said decoder means and is held in common between said control means and said decoder means, so that said control means and said decoder means are directly accessible to said random-accessible large capacity storage means respectively.

6. The information processing device as claimed in claim 1, wherein, every time a request for adding/renewal of a video/audio soft is inputted to said control means from an external, said control means checks in response to the adding/renewal request whether or not there exists a spare room for data transfer to said random-accessible large capacity storage means, based on the current reproduction condition of the video/audio soft data, and when said random-accessible large capacity storage means has a spare room for data transfer, said control means confirms the file name of the requested video/audio soft for adding/renewal, and thereafter said control means receives the data of the requested video/audio soft adding/renewal to thereby carry out the adding/renewal for the video/audio soft to said random-accessible large capacity storage means in a period when said decoder means reads the data from said random-accessible large capacity storage means, and when there is no spare room for data transfer, a reply is sent such that the request for adding/renewing the video audio soft is to be retransmitted after a predetermined time lapse when the presence of a spare room for transfer is guessed based on the present reproduction condition of the video/audio soft.

7. The information processing device as claimed in claim 1, wherein the video/audio soft is a video soft having compression-coded data and said decoder means comprises a video decoder device for decoding the compression-coded video soft data, and wherein said video decoder device accommodates a plurality of MPEG decoders serving as data extending means for extending and thawing digital data of a compression-coded video soft, corresponding to the plural output channels.

8. The information processing device as claimed in claim 7, wherein said video decoder device accommodates a plurality of DRAMs for temporarily storing the digital data of the video/audio soft read out from said random-accessible large capacity storage means, a plurality of MPEG decoders arranged in parallel corresponding to said plural DRAMs for extending and restoring the read-out data, corresponding to the number of the channels of said video decoder device, and a pair of first-in data first-out memories arranged in parallel between said each DRAM and MPEG decoder for converting parallel data to serial data, whereby the data intermittently read out from said pair of DRAMs is continuously supplied to said MPEG decoder.

9. The information processing device as claimed in claim 1, wherein the video/audio soft is a game soft and said decoder means comprises a game decoder device for decoding the game soft data, an wherein said game decoder device accommodates game data extending devices for extending and thawing digital data of a game soft and varying the data in response to a pad signal from an external, corresponding to the plural output channels of said game decoder device.

10. The information processing device as claimed in claim 9, wherein said game decoder device accommodates a plurality of DRAMs for temporarily storing the digital data of the game soft read out from said random-accessible large capacity storage means, a plurality of game decoder elements arranged in parallel corresponding to said plural DRAMs for extending and restoring the read-out data, corresponding to the number of the channels of said game decoder device, and bi-directional first-in data first-out memories arranged in parallel between said each DRAM and game decoder elements, whereby the data intermittently read out from said pair of DRAMs is continuously supplied to said game decoder elements.

11. An information processing system in a multi-channel data transfer network, wherein said information processing system serves as a data supply side and includes a host computer, an information processing device, a switching device and a plurality of terminal devices, wherein said host computer generally controls said information processing device and said switching device and receives requests for reproduction of video/audio data from any of said plurality of terminal devices and transmits the requests for reproduction to said information processing device and controls the circuit connection of said switching device so that the reproduced video/audio data is supplied from said data processing device to each of said plurality of terminal devices which is a source of generating the request for reproduction, characterized in that said information processing device comprises:

random-accessible large capacity storage means for storing digital data of a plurality of video/audio softs previously allocated to channels, every predetermined blocks in dispersion, wherein the stored digital data can be a combination of conventional video contents and game contents;

control means having management information which indicates file names of the plural video/audio softs, recording positions in said random-accessible large capacity storage means, and allocated channel numbers, receiving a request for designating reproduction of any one data of the plural video/audio softs from an external, and designating reproduction of a data file of one video/audio soft corresponding to the request of reproduction-designation to said random-accessible large capacity storage means every time the request command is inputted; and decoder means having a plurality of output channels simultaneously outputting video/audio soft data in parallel, registering the management information transferred from said control means, directly accessing the random-accessible large capacity storage means to intermittently read out the video/audio soft data designated by said control means from said random-accessible large capacity storage means based on the management information, every blocks in dispersion to be decoded, and thereafter continuously outputting the requested video/audio soft data in analog form from a channel of a designated number.

12. An information processing method in a multi-channel data transfer network, wherein said information processing method is performed on a data supply side and comprises:

storing digital data of a plurality of video/audio softs previously allocated to channels, every predetermined blocks in dispersion, in random-accessible large capacity storage means, wherein the stored digital data can be a combination of conventional video contents and game contents;

receiving a request for designating reproduction of any one data of the plural video/audio softs from an external, and designating reproduction of a data file of one video/audio soft corresponding to the request of reproduction-designation to the random-accessible large capacity storage means every time the request command is inputted;

registering management information which indicates file names of the plural video/audio softs, recording positions in the random-accessible large capacity storage means, allocated channel numbers and the like;

confirming whether or not there exists a vacant channel based on the management information;

directly accessing the random-accessible large capacity storage means to intermittently read out the designated video/audio soft data by time division every predetermined blocks from the random-accessible large capacity storage means based on the management information; and decoding the intermittently read out data by time division and continuously outputting the read out data in analog form from a channel of the designated number after subject to D/A conversion.

13. The method as claimed in claim 12, wherein said decoding comprises reading out by random-accessing the video/audio soft data stored in dispersion in the plurality of random-accessible large capacity storage means.

14. The method as claimed in claim 12, wherein said decoding comprises:

temporarily storing the digital data of the video/audio soft read out from the random-accessible large capacity storage means;

extending and restoring the read out data; and converting the extended data from parallel data into serial data.

15. The method as claimed in claim 12, comprising:

every time a request for adding/renewal of a video/audio soft is inputted from an external, checking in response to the adding/renewal request whether or not there exists a spare room for data transfer to the random-accessible large capacity storage means, based on the current reproduction condition of the video/audio soft data;

when the random-accessible large capacity storage means has a spare room for data transfer, confirming the file name of the requested video/audio soft for adding/renewal, and thereafter receiving the data of the requested video/audio soft for adding/renewal to thereby write the video/audio soft data for adding/renewal to be intermittently inputted every block in dispersion into the random-accessible large capacity storage means to thereby carry out the adding/renewal of the video/audio soft in a period of reading the data from the random-accessible large capacity storage means;

and when there is no spare room for data transfer, replying that the request for adding/renewing the video/audio soft is to be retransmitted after a predetermined time lapse when the presence of a spare room for transfer is guessed based on the present reproduction condition of the video/audio soft.

16. The method as claimed in claim 12, wherein the video/audio soft is a video soft having compression-coded data and said decoding comprises decoding the compression-coded video soft data.

17. The method as claimed in claim 12, wherein the video/audio soft is a game soft and said decoding comprises decoding the game soft data, and wherein said decoding the game soft data comprises extending and thawing digital data of the game soft to be varied in response to a pad signal from an external.

* * * * *